US012797657B2

(12) United States Patent
Jeong

(10) Patent No.: US 12,797,657 B2
(45) Date of Patent: Nov. 17, 2026

(54) SYSTEM FOR AND METHOD OF EXTINGUISHING FIRE OCCURRING IN HIGH-VOLTAGE BATTERY FOR VEHICLE

(71) Applicants: Hyundai Motor Company, Seoul (KR); Kia Corporation, Seoul (KR)

(72) Inventor: Young-Bin Jeong, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 18/242,421

(22) Filed: Sep. 5, 2023

(65) Prior Publication Data

US 2024/0173580 A1 May 30, 2024

(30) Foreign Application Priority Data

Nov. 25, 2022 (KR) ........................ 10-2022-0160749

(51) Int. Cl.
*A62C 3/07* (2006.01)
*B60L 50/64* (2019.01)
*B60L 58/26* (2019.01)

(52) U.S. Cl.
CPC ................ *A62C 3/07* (2013.01); *B60L 50/64* (2019.02); *B60L 58/26* (2019.02)

(58) Field of Classification Search
CPC ............ A62C 3/07; B60L 50/64; B60L 58/26
See application file for complete search history.

(56) References Cited

U.S. PATENT DOCUMENTS

2022/0273975 A1 9/2022 Svensson

FOREIGN PATENT DOCUMENTS

| | | | | | |
|---|---|---|---|---|---|
| CN | 105977521 | A | * | 9/2016 | ........ H01M 10/6569 |
| CN | 114628839 | A | * | 6/2022 | ............... A62C 3/16 |
| DE | 102021211577 | A1 | * | 9/2022 | ............... A62C 3/07 |
| JP | 2017147128 | A | * | 8/2017 | ............... A62C 3/16 |
| KR | 10-2022-0027937 | A | | 3/2022 | |
| KR | 102406230 | B1 | * | 6/2022 | ........ H01M 10/6567 |

OTHER PUBLICATIONS

DE 102021211577 Translation (Year: 2022).*
JP 2017147128 Translation (Year: 2017).*
KR 102406230 Translation (Year: 2022).*
CN 105977521 Translation (Year: 2016).*
CN 114628839 Translation (Year: 2022).*

* cited by examiner

*Primary Examiner* — Steven M Cernoch
(74) *Attorney, Agent, or Firm* — MORGAN, LEWIS & BOCKIUS LLP

(57) ABSTRACT

A system for extinguishing a fire occurring in a high-voltage battery for a vehicle includes: a battery cell assembly in which a plurality of battery cells are stacked each other, an extinguishing-liquid tank inside which an extinguishing liquid is stored, an extinguishing-liquid supply line connecting the extinguishing-liquid tank and the inside of the battery cell assembly to each other, a coolant joining line branching off from a coolant line 25 through which a coolant circulates along the outside of the battery cell assembly and a radiator, the coolant being supplied to the inside of the battery cell assembly through the coolant joining line, and a control unit configured to perform control so that the extinguishing liquid and the coolant are supplied to the battery cell assembly through the extinguishing-liquid supply and coolant joining lines, when the control unit concludes that a fire occurs in the battery cell assembly.

9 Claims, 3 Drawing Sheets

SYSTEM FOR AND METHOD OF EXTINGUISHING FIRE OCCURRING IN HIGH-VOLTAGE BATTERY FOR VEHICLE

CROSS-REFERENCE TO RELATED APPLICATION

The present application claims priority to Korean Patent Application No. 10-2022-0160749, filed on Nov. 25, 2022, the entire contents of which is incorporated herein for all purposes by this reference.

BACKGROUND OF THE PRESENT DISCLOSURE

Field of the Present Disclosure

The present disclosure relates to a system for and a method of extinguishing a fire occurring in a high-voltage battery for a vehicle, the system and the method being configured for supplying both extinguishing liquid and a coolant cooling a high-voltage battery to the high-voltage battery when the fire occurs in the high-voltage battery mounted in the vehicle, extinguishing the fire occurring in the high-voltage battery.

DESCRIPTION OF RELATED ART

In recent years, due to electrification of vehicles, eco-friendly vehicles, each being provided with a high-voltage battery, such as electric vehicles, have rapidly gained popularity.

The high-voltage battery is charged with high-density electrical energy. The high-voltage battery, in which cells in which an anode, a cathode, an electrolyte, and a separator are provided are stacked each other, is packaged in the form of a battery pack. For the present reason, in a case where a fire occurs in the high-voltage battery, there occurs a problem in that the fire is not easy to extinguish.

An aspect of the fire occurring in the high-voltage battery is that a fire, when occurring in any one cell, rapidly spreads to an adjacent cell and burns until the high-voltage battery is entirely burnt down.

Normally, a method of extinguishing the fire occurring in the high-voltage battery is to spray water until the fire is extinguished. However, because the cells are stacked each other inside a casing of the high-voltage battery, the water sprayed from the outside thereof does not readily reach the inside of the high-voltage battery. Thus, the fire is difficult to substantially extinguish. Accordingly, it takes several tens of hours to extinguish the fire occurring in the high-voltage battery.

To solve the present problem, a prefabricated water tank is provided in the vicinity of the vehicle. The water tank is filled with water, and the high-voltage battery is immersed in the water, extinguishing the fire. However, there is a problem in that the prefabricated water tank is not easy to install in the vicinity of the vehicle in which the fire occurs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system for and a method of extinguishing a fire occurring in a high-voltage battery for a vehicle, the system and the method being configured for supplying extinguishing liquid stored and a coolant flowing for cooling to a high-voltage battery at the same time in a concentrated manner when the fire occurs in the high-voltage battery, extinguishing the fire using the extinguishing liquid and the coolant.

To accomplish the above-mentioned object, according to an aspect of the present disclosure, there is provided a system for extinguishing the fire occurring in a high-voltage battery for a vehicle, the system including: a battery cell assembly in which a plurality of battery cells are stacked each other: an extinguishing-liquid tank inside which an extinguishing liquid is stored: an extinguishing-liquid supply line connecting the extinguishing-liquid tank and the inside of the battery cell assembly to each other: a coolant joining line branching off from a coolant line through which a coolant circulates along the outside of the battery cell assembly and a radiator and connected to the extinguishing-liquid supply line, the coolant being supplied to the inside of the battery cell assembly through the coolant joining line: and a control unit configured to perform control so that the extinguishing liquid and the coolant are supplied to the inside of the battery cell assembly through the extinguishing-liquid supply line and the coolant joining line, when the control unit concludes that the fire occurs in the battery cell assembly.

In the system, an extinguishing-liquid supply valve that allows or disables the supplying of the extinguishing liquid may be provided in the extinguishing-liquid supply line, a coolant supply valve that allows or disables the supplying of the coolant may be provided in the coolant joining line, and when the control unit concludes that the fire occurs in the battery cell assembly, the control unit may perform control so that the extinguishing liquid and the coolant are supplied to the battery cell assembly, by causing the extinguishing-liquid supply valve and the coolant supply valve to be open.

In the system, the coolant joining line may be connected to the extinguishing-liquid supply line between the extinguishing-liquid supply valve and the battery cell assembly.

The system may further include a water pump controlled by the control unit and provided between the radiator and the coolant supply valve in the coolant line.

In the system, when the extinguishing liquid and the coolant are supplied, and thus the battery cell assembly starts to be immersed in the extinguishing liquid and the coolant, the control unit may operate the water pump so that the water pump produces a maximum output.

In the system, when the control unit concludes that a water level of the extinguishing liquid and the coolant reaches a preset water level at which the battery cell assembly is immersed, the control unit may stop the water pump from operating.

In the system, a temperature sensor which is configured to detect a temperature of the battery cell assembly may be provided inside a battery pack in which the battery cell assembly is mounted, and when the temperature of the battery cell assembly which is input from the temperature sensor is the same as or higher than a thermal runaway temperature, the control unit may be configured to determine that the fire occurs in the battery cell assembly.

In the system, an off-gas sensor which is configured to detect off gas occurring when the fire occurs in the battery cell assembly may be provided inside the battery pack in which the battery cell assembly is mounted, and when the off-gas sensor detects the off gas, the control unit may be configured to determine that the fire occurs in the battery cell assembly.

According to another aspect of the present disclosure, there is provided a method of extinguishing the fire occurring in a high-voltage battery for a vehicle, the method including: a battery temperature determination step of determining, by a main control unit, whether or not temperature of a battery cell assembly is the same as or higher than a thermal runaway temperature: an off-gas detection step of determining, by the main control unit, whether or not off gas occurs from the battery cell assembly: and a valve opening step of supplying, by the main control unit, the extinguishing liquid and a coolant into the battery cell assembly by causing an extinguishing-liquid supply valve and a coolant supply valve to be open, the extinguishing-liquid supply valve being provided between the battery cell assembly and an extinguishing-liquid tank inside which the extinguishing liquid is stored, and the coolant supply valve being provided between a radiator and the battery cell assembly.

The method may, after the valve opening step, further include a fail-safe step of performing, by the main control unit, control when the battery cell assembly is immersed in the extinguishing liquid and the coolant and thus a high-voltage system control unit is in a state of being unable to perform communication with the control unit: and a water pump operation step of operating, by the main control unit, a water pump circulating the coolant, according to a predetermined logic.

In the method, in the water pump operation step, the control unit may operate the water pump so that the water pump produces a maximum output.

The method may, after the water pump operation step, further include: an immersion completion determination step of determining, by the main control unit, whether or not a water level of the extinguishing liquid and the coolant inside the battery cell assembly is the same as or higher than a preset water level at which the battery cell assembly is completely immersed: and a water pump stopping step of stopping, by the main control unit, the water pump from operating when the water level of the extinguishing liquid and the coolant is the same as or higher than the preset water level.

The method may, before the battery temperature determination step, further include a sensor operation start step of inputting into the control unit an output value of a temperature sensor configured for measuring temperature of the battery cell assembly and an output value of an off-gas sensor that is configured to detect off gas occurring from the battery cell assembly.

In the method, the off-gas detection step may be first performed, and then the battery temperature determination step may be performed.

In the method, when the temperature of the battery cell assembly is neither the same as, nor higher than a thermal runaway temperature in the battery temperature determination step, the battery temperature determination step may be repeatedly performed.

In the method, when it is not detected in the off-gas detection step that the off gas occurs, the off-gas detection step may be repeatedly performed.

With the system for and the method of extinguishing the fire occurring in a high-voltage battery for a vehicle according to an exemplary embodiment of the present disclosure that are configured as above described, when it is detected that the fire occurs in the high-voltage battery, the extinguishing liquid and the coolant may be supplied to the high-voltage batter at the same time, and thus, the fire may be extinguished at an early stage using the supplied extinguishing liquid and coolant.

When it is detected that the fire occurs, the water pump may be caused to operate to produce a maximum output. Thus, the extinguishing liquid and the coolant may be supplied to the high-voltage battery in a concentrated manner, and thus the fire may be rapidly extinguished.

Furthermore, the water pump is caused to stop operating when the water level of the extinguishing liquid and the coolant reaches a predetermined value, so that the high-voltage battery is immersed. Accordingly, consumption of the coolant may be reduced, and the high-voltage battery may be kept completely immersed. Thus, the fire stops burning.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
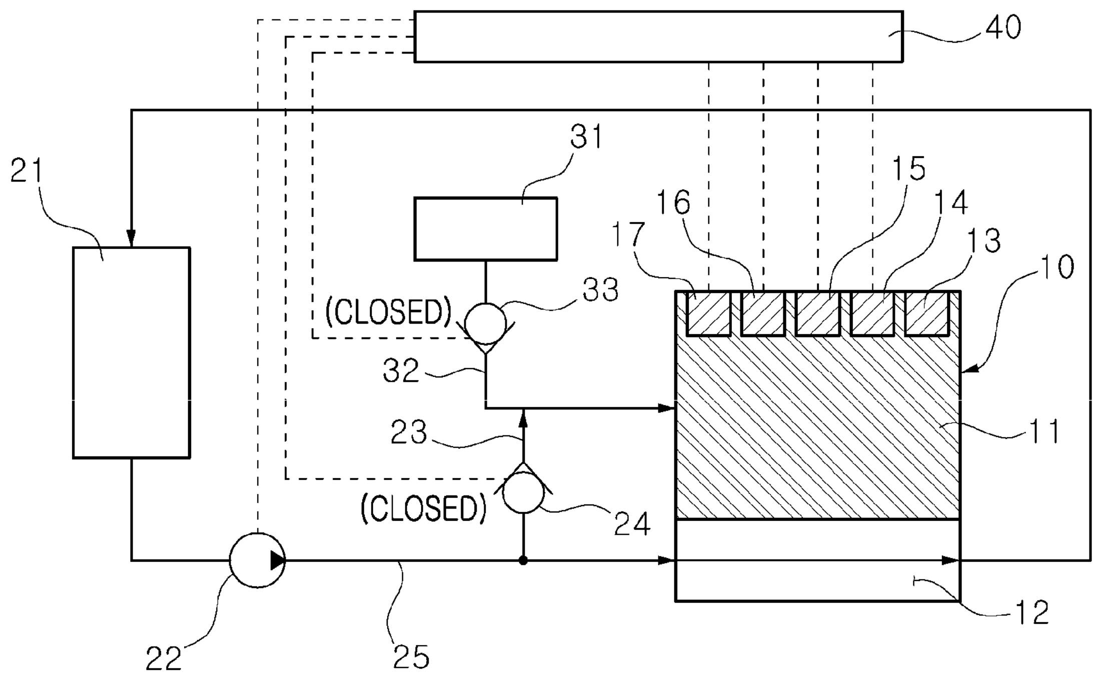
FIG. 1 is a schematic view exemplarily illustrating a system for extinguishing a fire occurring in a high-voltage battery for a vehicle according to an exemplary embodiment of the present disclosure.
Figure 2:
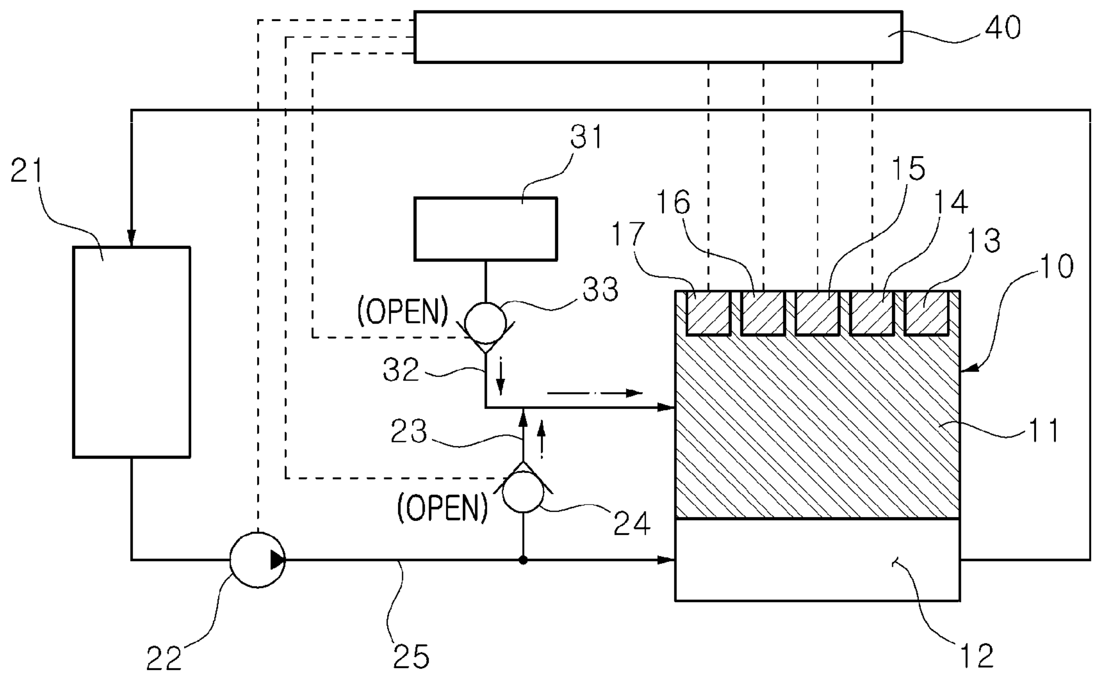
FIG. 2 is a schematic view exemplarily illustrating the system for extinguishing a fire occurring in a vehicle high-voltage battery according to an exemplary embodiment of the present disclosure, the system that operates when a fire occurs in a high-voltage battery.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A system for and a method of extinguishing a fire occurring in a high-voltage battery for a vehicle according to an exemplary embodiment of the present disclosure will be described in detail below with reference to the accompanying drawings.

The system for extinguishing a fire occurring in a high-voltage battery for a vehicle according to an exemplary embodiment of the present disclosure includes: a battery cell assembly 11 in which a plurality of battery cells are stacked each other: an extinguishing-liquid tank 31 inside which an extinguishing liquid is stored: an extinguishing-liquid supply line 32 connecting the extinguishing-liquid tank 31 and the inside of the battery cell assembly 11 to each other: a coolant joining line 23 branching off from a coolant line 25 through which a coolant circulates along the outside of the battery cell assembly 11 and a radiator 21, the coolant being supplied to the battery cell assembly 11 through the coolant joining line 23: and a main control unit 40 configured to perform control so that the extinguishing liquid and the coolant are supplied to the battery cell assembly 11 through the extinguishing-liquid supply line 32 and the coolant joining line 23, when detecting that a fire occurs in the battery cell assembly 11.

In a high-voltage battery according to an exemplary embodiment of the present disclosure, as illustrated in FIG. 1, the battery cells stacked each other form the battery cell assembly 11. The battery cell assembly 11 is packaged with a casing, such as one including an upper casing and a lower casing, and when packaged, includes the form of a battery pack 10.

The battery cell assembly 11 is cooled by the coolant so that the battery cell assembly 11 operates at an optimal temperature.

The coolant cools the battery cell assembly 11 while circulating the radiator 21 and the battery cell assembly 11 through the coolant line 25. A lower cooling passage 12 is formed to one side of the battery cell assembly 11, for example, under the battery cell assembly 11 of the battery pack 10, and the lower cooling passage 12 is connected to the coolant line 25. Thus, the coolant flows into the battery pack 10 and thus cools the battery cell assembly 11.

A water pump 22 that circulates the coolant is provided in the coolant line 25. An output of the water pump 22 may vary according to a requirement for cooling performance and may adjust an amount of the coolant flowing to the battery cell assembly 11 and a speed at which the coolant is supplied.

A steam discharge valve 13 which is configured to discharge steam out of the battery pack 10 in a case where pressure inside the battery pack 10 is excessively increased is provided in one side of the battery pack 10. When the pressure inside the battery pack 10 reaches a predetermined pressure, the steam discharge valve 13 is open, and thus prevents the pressure inside the battery pack 10 from being excessively increased.

Sensors 14 and 15 for detecting that a fire occurs in the battery cell assembly 11 are provided in the battery pack 10. The sensors 14 and 15 may be a temperature sensor 14 and an off-gas sensor 15, respectively.

The temperature sensor 14 is provided in one side of the battery pack 10 and detects temperature of the battery cell assembly 11. When the temperature of the battery cell assembly 11 which is detected by the temperature sensor 14 is higher than a thermal runaway temperature which is preset so that thermal runaway is determined to occur in the battery cell assembly 11, it may be determined that a fire occurs in the battery cell assembly 11.

The off-gas sensor 15 detects off gas that occurs when a fire occurs in the battery cell assembly 11.

With the measurement of the temperature of the battery cell assembly 11 by the temperature sensor 14, and with the determination of whether or not the off gas occurs, it is doubly detected that a fire occurs in the battery cell assembly 11 catch fire. Thus, the system for extinguishing a fire occurring in a high-voltage battery may be prevented from malfunctioning.

Furthermore, a sensor configured for determining water level of the extinguishing liquid and the coolant, which are supplied into the battery pack 10, when a fire occurs is provided inside the battery pack 10.

The sensor configured for determining the water level of the extinguishing liquid and the coolant may be a pressure sensor 16 that measures pressure inside the battery pack 10 or may be a water-level sensor that directly measures the water level of the extinguishing liquid and the coolant. The extinguishing liquid and the coolant are supplied into the battery pack 10, and the water level thereof is raised, increasing the pressure inside the battery pack 10. Accordingly, the pressure sensor 16 may indirectly measure the water level of the extinguishing liquid and the coolant.

A high-voltage system control unit 17 that is configured to control a high-voltage voltmeter, as well as the battery pack 10, is provided inside or adjacent to the battery pack 10. The high-voltage system control unit 17 transmits a state of the battery cell assembly 11 to the main control unit 40 while continuously communicating with the main control unit 40 of a vehicle. According to a command transmitted from the main control unit 40, the high-voltage system control unit 17 is configured to control the battery cell assembly 11. When the extinguishing liquid and the coolant start to be supplied to the battery cell assembly 11, because the high-voltage system control unit 17 is immersed in the extinguishing liquid and the coolant, the high-voltage system control unit 17 stops transmitting a signal. When the high-voltage system control unit 17 stops transmitting the signal, the main control unit 40 operates according to a fail-safe logic which is a prestored logic. A case where the high-voltage system control unit 17 is immersed in the extinguishing liquid and the coolant is when the extinguishing liquid and the coolant are supplied to the battery cell assembly 11 due to the occurrence of the fire. The supplying of the extinguishing liquid and the coolant means that a fire occurs in the battery cell assembly 11.

Accordingly, the main control unit 40 operates the water pump 22 so that the water pump 22 produces an increased output and thus that the fire occurring in the battery cell assembly 11 is promptly extinguished.

According to an exemplary embodiment of the present disclosure, the coolant that cools the battery cell assembly 11 is used to extinguish the fire occurring in the battery cell assembly 11. Furthermore, in addition to the coolant, the extinguishing liquid is provided. When a fire occurs, the extinguishing liquid, together with the coolant, is supplied to the battery cell assembly 11.

To the present end, the extinguishing-liquid tank 31 inside which the extinguishing liquid is stored is provided. The extinguishing-liquid tank 31 is connected to the battery cell assembly 11 and the extinguishing-liquid supply line 32.

An extinguishing-liquid supply valve 33 that allows or disables the supplying of the extinguishing liquid is provided in the extinguishing-liquid supply line 32. The extinguishing-liquid supply valve 33 is closed during normal operation. However, when a fire occurs in the battery cell assembly 11, the extinguishing-liquid supply valve 33 is open, and thus allows the extinguishing liquid to be supplied from the extinguishing-liquid tank 31 to the battery cell assembly 11. The extinguishing-liquid supply valve 33 is a check value that operates so that the extinguishing liquid is supplied only in the direction from the extinguishing-liquid tank 31 toward the battery cell assembly 11.

The coolant joining line 23 that branches off from the coolant line 25 and is connected to the extinguishing-liquid supply line 32 so that the coolant is supplied to the battery cell assembly 11 to extinguish the file is provided. The coolant joining line 23 branches off from the coolant line 25 between the water pump 22 and the lower cooling passage 12. Moreover, the coolant joining line 23 joins the extinguishing-liquid supply line 32 between the extinguishing-liquid supply valve 33 and the battery cell assembly 11. Accordingly, when a fire occurs in the battery cell assembly 11, the coolant is supplied to the battery cell assembly 11 through the coolant line 25, the coolant joining line 23 and the extinguishing-liquid supply line 32 in the present order, so that the fire is extinguished.

A coolant supply valve 24 that allows or disables the supplying of the coolant is provided in the coolant joining line 23. The coolant supply valve 24 is closed during normal operation. However, when a fire occurs in the battery cell assembly 11, the coolant supply valve 24 is open, and thus allows the coolant to be supplied from the coolant line 25 to the battery cell assembly 11. The coolant supply valve 24 is a check valve that operates so that the coolant is supplied only in the direction from the coolant line 25 toward the battery cell assembly 11. The water pump 22 may be provided between the radiator 21 and the coolant supply valve 24 in the coolant line 25 so that the coolant is supplied to the battery cell assembly 11 when a fire occurs in the battery cell assembly 11. The water pump 22 may be provided between the radiator 21 and a point at which the coolant joining line 23 branches off from the coolant line 25.

The main control unit 40 detects that a fire occurs in the battery cell assembly 11, according to values that are input from various sensors, for example, the temperature sensor 14 and the off-gas sensor 15, that are provided in the battery pack 10.

Furthermore, when detecting that a fire occurs in the battery cell assembly 11, the main control unit 40 causes the extinguishing-liquid supply valve 33 and the coolant supply valve 24 to be open, and thus the extinguishing liquid and the coolant are supplied to the battery cell assembly 11, extinguishing the fire.

In an exemplary embodiment of the present disclosure, the extinguishing-liquid supply valve 33 and the coolant supply valve 24 may include actuators electrically connected to the main control unit 40 so that the extinguishing-liquid supply valve 33 and the coolant supply valve 24 may be selectively operated according to command signals of the main control unit 40.

Moreover, the main control unit 40 may be configured for controlling an amount of the coolant which is supplied to the battery cell assembly 11, by controlling the water pump 22. The main control unit 40 is configured to perform normal control while continuously communicating with the high-voltage system control unit 17 that is configured to control the high-voltage voltmeter, as well as the battery pack 10. Furthermore, in a case where the communication with the high-voltage system control unit 17 is interrupted due to the occurrence of the fire, the main control unit 40 causes the fail-safe logic to be implemented.

A control method described below is stored, as a logic, inside the main control unit 40.

Figure 3:
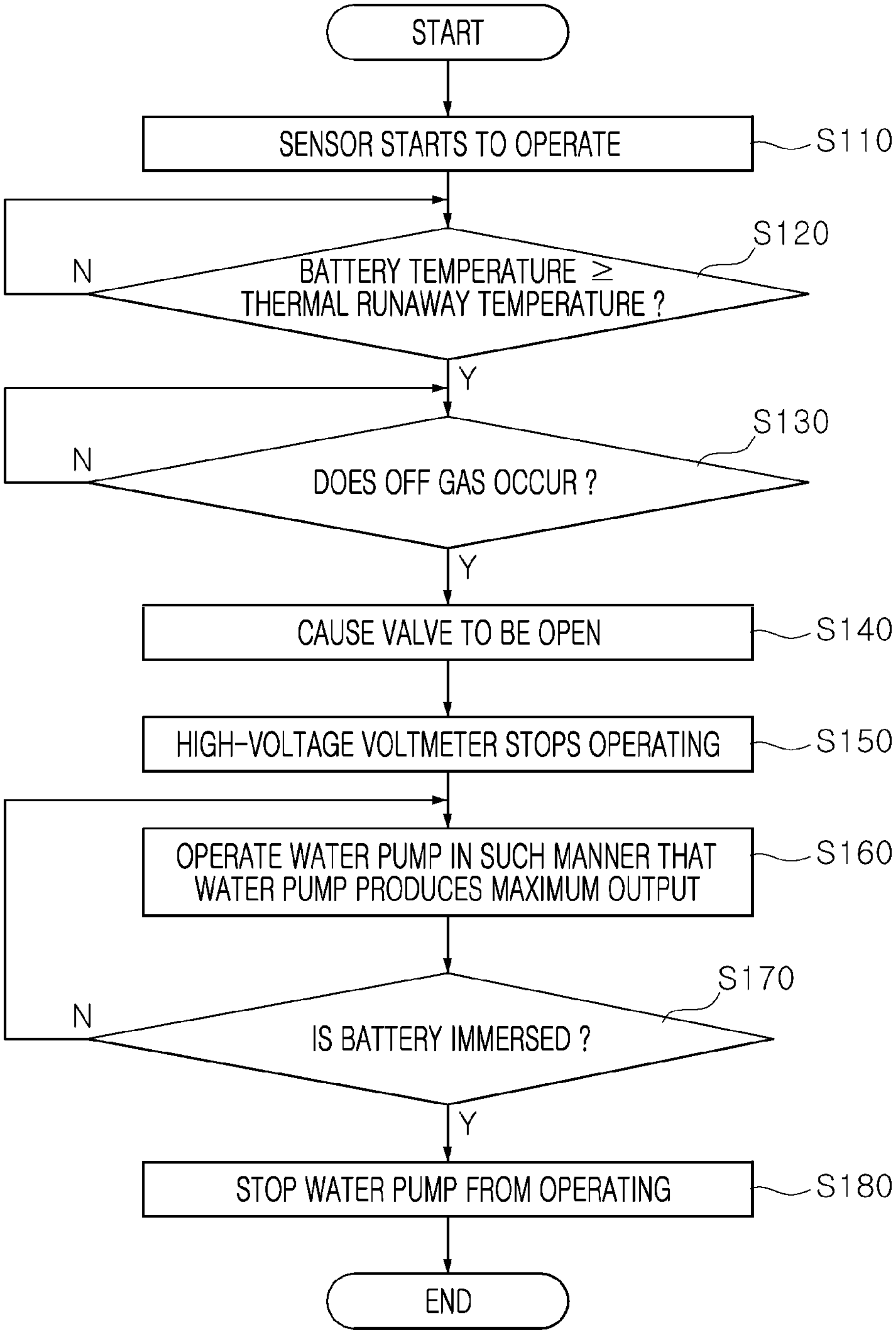
FIG. 3 is a flowchart illustrating a method of extinguishing a fire occurring in a high-voltage battery for a vehicle according to an exemplary embodiment of the present disclosure.

FIG. 3 illustrates the method of extinguishing a fire occurring in a high-voltage battery for a vehicle according to an exemplary embodiment of the present disclosure.

The method of extinguishing a fire occurring in a high-voltage battery for a vehicle according to an exemplary embodiment of the present disclosure is performed by the system for extinguishing a fire occurring in a high-voltage battery for a vehicle, which is described above.

In a sensor operation start step S110, a sensor configured for detecting that a fire occurs in the battery cell assembly 11 starts to operate, and an output value of the sensor starts to be input into the main control unit 40. That is, an output value of the temperature sensor 14 that measures the temperature of the battery cell assembly 11 and an output value of the off-gas sensor 15 which is configured to detect off gas occurring from the battery cell assembly 11 are input into the main control unit 40. In the sensor operation start step S110, the system for extinguishing a fire occurring in a high-voltage battery for a vehicle starts to operate.

In a battery temperature determination step S120, the main control unit 40 is configured to determine whether or not the temperature of the battery cell assembly 11 is the same as or higher than a thermal runaway temperature which is preset so that thermal runaway is determined to occur in the battery cell assembly 11. To determine the fire occurring in the battery cell assembly 11, the main control unit 40 may continuously monitor the output value of the temperature sensor 14. When the temperature of the battery cell assembly 11 based on the output value of the temperature sensor 14 is the same as or higher than the thermal runaway temperature, the main control unit 40 may be configured to conclude that a fire occurs in the battery cell assembly 11.

In an off-gas detection step S130, it is determined whether or not off gas occurs from the battery cell assembly 11. When a fire occurs, off gas occurs in the battery cell assembly 11. Because the off-gas sensor 15 detects the off gas, it may be recognized that a fire occurs in the battery cell assembly 11.

After the conditions in the battery temperature determination S120 and the off-gas detection step S130 are both satisfied, the next step is performed. The battery temperature determination step S120 and the off-gas detection step S130 may be performed in reverse order. That is, the off-gas detection step S130 may be performed earlier than the battery temperature determination step S120.

When the conditions in the battery temperature determination S120 and the off-gas detection step S130 are both satisfied, the main control unit 40 is configured to conclude that a fire occurs in the battery cell assembly 11 and is configured to perform control described below to extinguish the fire.

When each of the conditions in the battery temperature determination step S120 and the off-gas detection step S130 is not satisfied, each of the battery temperature determination step S120 and the off-gas detection step S130 is repeatedly performed.

In a valve opening step S140, the main control unit 40 causes the extinguishing-liquid supply valve 33 to be open so that the extinguishing liquid is supplied to the battery cell assembly 11 and causes the coolant supply valve 24 to be open so that the coolant is supplied to the battery cell assembly 11. When the extinguishing-liquid supply valve 33 and the coolant supply valve 24 are open, the extinguishing liquid and the coolant are supplied into the battery pack 10, and the battery cell assembly 11 starts to be immersed in the extinguishing liquid and the coolant.

In the valve opening step S140, the extinguishing liquid and the coolant may flow into the battery cell assembly 11 in which a fire occurs, and thus the fire occurring in the battery cell assembly 11 may be extinguished at an early stage. The battery cell assembly 11 is in a state of being packaged in the form of a battery pack, for example, with an upper casing and a lower casing. Therefore, water, although injected from the outside, cannot reach the battery cell assembly 11. However, the extinguishing liquid and the coolant may be directly supplied to the battery cell assembly 11, and thus can extinguish the fire at an early stage.

In a fail-safe step S150, when the battery cell assembly 11 is immersed in the extinguishing liquid and the coolant and thus the high-voltage system control unit 17 is in a state of being unable to perform communication, the main control unit 40 implements a predetermined logic. When the extinguishing liquid and the coolant are supplied into the battery cell assembly 11, the immersion of the battery cell assembly makes it impossible to perform communication between the main control unit 40 and the high-voltage system control unit 17 which is provided in the battery pack 10 and is configured to control the high-voltage voltmeter, as well as the battery cell assembly 11. The reason for this is because the extinguishing liquid and the coolant are supplied into the battery cell assembly 11 due to the fire occurring in the battery cell assembly 11. Therefore, it may be recognized that the battery cell assembly 11 catches fire. Therefore, when the high-voltage system control unit 17 is in the state of being unable to perform communication, the main control unit 40 is configured to perform the fail-safe step S150 in which control is performed according to a predetermined logic.

In a water pump operation step S160, the main control unit 40 operates the water pump 22 according to the predetermined logic. In the water pump operation step S160, the main control unit 40 operates the water pump 22 in such a manner the water pump 22 produces a maximum output and that a larger amount of the coolant is supplied to extinguish the fire occurring in the battery cell assembly 11. When the water pump 22 operates so that it produces the maximum output, a maximum amount of the coolant is discharged from the water pump 22, increasing a speed at which the coolant is supplied.

The maximum amount of the coolant which is discharged at a maximum speed from the water pump 22 may be supplied toward the battery cell assembly 11 through the coolant joining line 23, and thus the fire occurring in the battery cell assembly 11 may be extinguished.

By performing the valve opening step S140 and the water pump operation step S160, the battery cell assembly 11 may be immersed in the extinguishing liquid and the coolant. Thus, the fire occurring in the battery cell assembly 11 may be extinguished.

When the extinguishing liquid and the coolant are continuously supplied into the battery cell assembly 11, the pressure inside the battery cell assembly 11 may be increased, and the battery cell assembly 11 may explode due to the increased pressure.

To prevent the present explosion of, the battery cell assembly 11, there is a need to supply amounts of the extinguishing liquid and the coolant, which are enough to extinguish the fire occurring in the battery cell assembly 11, to the battery cell assembly 11 and then to stop supplying the extinguishing liquid and the coolant.

To the present end, an immersion completion determination step S170 of determining the water level of the extinguishing liquid and the coolant, and a water pump stopping step S180 of stopping the water pump 22 from operating are performed.

In the immersion completion determination step S170, the main control unit 40 is configured to determine whether or not the water level of the extinguishing liquid and the coolant inside the battery cell assembly 11 is the same as or higher than a preset water level at which the battery cell assembly 11 is completely immersed. At the present point, the water level of the extinguishing liquid and the coolant may also be directly measured, but may be indirectly measured using the pressure sensor 16. That is, without mounting a separate water-level sensor, the water level may be determined according to whether or not the pressure inside the battery cell assembly 11 reaches a preset pressure, using the pressure sensor 16 for monitoring the state of the battery cell assembly 11. When the pressure inside the battery cell assembly 11 reaches the preset pressure, the main control unit 40 may be configured to determine that the battery cell assembly 11 is completely immersed, so that the battery cell assembly 11 is completed immersed in the extinguishing liquid and the coolant and is kept stable.

The water pump stopping step S180 is performed when it is determined in the immersion completion determination step S170 that the battery cell assembly 11 is completely immersed in the extinguishing liquid and the coolant. In the water pump stopping step S180, the main control unit 40 stop the water pump 22 from operating, so that the coolant is no longer supplied to the battery cell assembly 11. The main control unit 40 may not only stop the water pump 22 from operating, but may also close the coolant supply valve 24 and the extinguishing-liquid supply valve 33.

When it is determined in the immersion completion determination step S170 that the battery cell assembly 11 is not completely immersed in the extinguishing liquid and the coolant, the immersion completion determination step S170 is repeatedly performed, and the extinguishing liquid and the coolant are continuously supplied until the battery cell assembly 11 is completely immersed.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless particularly stated otherwise, a singular form may also include a plural form. The expression “at least one (or one or more) of A, B, and C” may include one or more of all combinations that may be made by combining A, B, and C.

In the exemplary embodiment of the present disclosure, it should be understood that a term such as “include” or “have” is intended to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for extinguishing a fire occurring in a high-voltage battery for a vehicle, the system comprising:
- a battery cell assembly in which a plurality of battery cells is stacked each other;
- an extinguishing-liquid tank inside which an extinguishing liquid is stored;
- an extinguishing-liquid supply line connecting the extinguishing-liquid tank and the inside of the battery cell assembly to each other;
- a coolant joining line branching off from a coolant line through which a coolant circulates along the outside of the battery cell assembly and a radiator and connected to the extinguishing-liquid supply line, the coolant being supplied to the inside of the battery cell assembly through the coolant joining line;
- a control unit configured to perform control so that the extinguishing liquid and the coolant are supplied to the inside of the battery cell assembly through the extinguishing-liquid supply line and the coolant joining line, when the control unit concludes that the fire occurs in the battery cell assembly;
- a steam discharge valve which is configured to discharge steam out of a battery pack in which the battery cell assembly is mounted in a case where pressure inside the battery pack is increased, the steam discharge valve disposed in one side of the battery pack; and
- a sensor configured for determining water level of the extinguishing liquid and the coolant, which are supplied into an inside of the battery pack so that the battery cell assembly is to be immersed for fire extinguishing, and the sensor is provided inside the battery pack,
- wherein when the control unit concludes that a water level of the extinguishing liquid and the coolant reaches a preset water level at which the battery cell assembly is immersed by the extinguishing liquid and the coolant, the control unit is configured to stop a water pump from operating.

2. The system of claim 1, further includes an extinguishing-liquid supply valve and a coolant supply valve,
- wherein the extinguishing-liquid supply valve that allows or disables supplying of the extinguishing liquid is provided in the extinguishing-liquid supply line,
- wherein the coolant supply valve that allows or disables supplying of the coolant is provided in the coolant joining line, and
- wherein, when the control unit concludes that the fire occurs in the battery cell assembly, the control unit is configured to perform control so that the extinguishing liquid and the coolant are supplied to the inside of the battery cell assembly, by causing the extinguishing-liquid supply valve and the coolant supply valve to be open.

3. The system of claim 2, wherein the coolant joining line is connected to the extinguishing-liquid supply line between the extinguishing-liquid supply valve and the battery cell assembly.

4. The system of claim 2, further including:

a water pump controlled by the control unit and provided between the radiator and the coolant supply valve in the coolant line.

5. The system of claim 1, wherein the extinguishing-liquid supply valve and the coolant supply valve are check valves.

6. The system of claim 1, wherein, when the extinguishing liquid and the coolant are supplied, and thus the battery cell assembly starts to be immersed in the extinguishing liquid and the coolant, the control unit is configured to operate a water pump so that the water pump produces a maximum output.

7. The system of claim 1, further including a temperature sensor, wherein the temperature sensor which is configured to detect a temperature of the battery cell assembly is provided inside the battery pack in which the battery cell assembly is mounted, and wherein, when the temperature of the battery cell assembly which is input from the temperature sensor is a same as or higher than a thermal runaway temperature, the control unit is configured to conclude that the fire occurs in the battery cell assembly.

8. The system of claim 1, further including an off-gas sensor, wherein the off-gas sensor which is configured to detect off gas occurring when the fire occurs in the battery cell assembly is provided inside the battery pack in which the battery cell assembly is mounted, and wherein, when the off-gas sensor detects the off gas, the control unit is configured to determine that the fire occurs in the battery cell assembly.

9. The system of claim 1, further including a lower cooling passage formed to one side of the battery cell assembly and is connected to the coolant line, so that the coolant is directly supplied to an outer surface of the battery cell assembly.

* * * * *